FIG I

PRIOR ART

INVENTOR.
SARKIS NERCESSIAN

INVENTOR.
SARKIS NERCESSIAN
BY
Alfred W. Barber
ATTORNEY

United States Patent Office 3,524,135
Patented Aug. 11, 1970

3,524,135
ERROR REDUCING METERING FOR A CONSTANT CURRENT REGULATED POWER SUPPLY
Sarkis Nercessian, Long Island City, N.Y., assignor to Forbro Design Corp., New York, N.Y., a corporation of New York
Filed Jan. 8, 1968, Ser. No. 702,153
Int. Cl. G01r 1/30
U.S. Cl. 324—123　　　　　　　　　　　　　1 Claim

ABSTRACT OF THE DISCLOSURE

The present invention is a combination of a single amplifier so connected as to provide simultaneous current and voltage metering of the load current and voltage provided by a current regulated power supply with substantially no error due to spurious loading of the power supply by either meter.

---

It is known the impedance such as voltmeters connected across constant current power supplies cause errors in the current supplied to the load. A method of compensating for such extraneous shunting impedance has been disclosed in U.S. Pat. No. 3,303,412. It is also known that operational amplifiers can be connected as impedance transformers but as far as is known this property of operational amplifiers has not been used or suggested to solve the loading problem in constant current power supplies.

Summary: The present invention comprises methods of and means for improving the accuracy of control of constant current and current regulating power supplies wherein an extraneous shunting current path or paths exist or are connected across the load. Such means are particularly adapted for use with current regulators which are equivalent to and may be represented by operational power supply configurations. In such configurations and circuits the regulating power supply may be represented in operational power supply form in which current regulation is achieved by feeding back the voltage across a current sampling resistor connected in series with the load being supplied with constant or regulated current. In such a circuit any extraneous shunting paths or loading circuits across either the load or the current sensing resistor will cause an error in the regulated current supplied to the load. Examples of such shunting circuits may be found in metering circuits so connected. The effect of a shunt across the current sensing resistor is a particularly troublesome problem when this resistor is adjustable or variable.

Considering the matter of the current sensing resistor shunting first, it is customary to design current metering circuits with a minimum series resistance and so chosen that this small series resistance is a current meter shunt. However, in the current regulating power supply circuit with which the present invention is concerned, the current sensing resistor is larger in value than the usual meter shunt in order to provide the required feedback voltage for the regulator. In this type of circuit the shunting current indicating meter causes large errors in the meter circuit must be carefully calculated and supplied with special corrective resistors. In a multirange device a substantial amount of additional precision circuitry is required for the current indicating meter. In accordance with the present invention, the current sensing resistors are chosen to produce a predetermined voltage drop which is the same for a plurality of current ranges and the current indicating meter is coupled to the current sensing resistors by means of an operation amplifier. The operational amplifier provides impedance transformation so that substantially no shunt is placed across the current sensing resistor while a low impedance output is provided to drive the current indicating meter. With this circuit the amplifier and meter combination circuit is fixed and unchanged for any number of current ranges supplied by varying or switching the current sensing resistor over a wide range of values.

The second source of error in a current regulating power supply of the type contemplated by the present invention is in voltmeter and any other extraneous shunting impedance across the load. Here again it has been found that an operational amplifier connected as an impedance transformer provides a unique solution to the problem. Here the high impedance input circuit of the operational amplifier is connected across the load and the output drives the voltmeter and any other extraneous load. By operating the operational amplifier in both cases with 100 percent feedback extremely high accuracy is achieved and the amplifiers provide very low output resistance so that the metering accuracy is not affected by variations in meter resistance.

A particularly useful circuit has been provided in which a single operational amplifier is connected to drive the current meter, the output voltmeter and any other extraneous loads. This has been found to be possible since both the current and voltage indicating meters are connected to a common point, i.e. the junction between the current sensing resistors and the load. Thus, by repeating the potential of this point by means of a high impedance input operational amplifier, both current indicating meter and voltmeter as well as extraneous impedance across the load can be supplied by a single operational amplifier.

DESCRIPTION OF THE PREFERRED EMBODIMENTS

Figure 1:
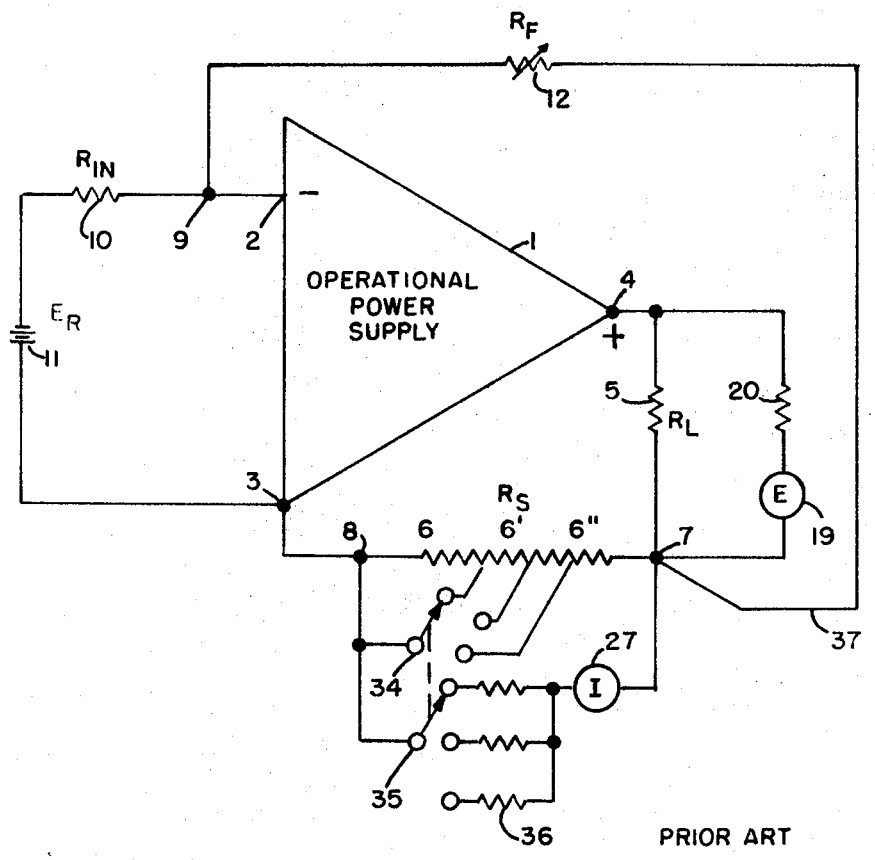
FIG. 1 is a simplified schematic circuit diagram of the prior art circuit for metering a current regulated power supply.

FIG. 1 is a schematic circuit diagram of a current regulating power supply employing operational power supply techniques. Such a regulator is described in detail in the Kepco Power Supply Handbook published by Kepco, Inc., Flushing, N.Y. 11352 and particular reference is made to fig. 4.8 on page 51 titled "Current Regulating Circuit." In FIG. 1 an operational power supply 1 has an inverting input terminal 2, an output terminal 4 and a common terminal 3. An input current is provided by a suitable source of reference voltage 11 and a current determining input resistor 10. An output load represented by resistor 5 is connected at one end to output 4 and at the other end through current sensing resistor 6, 6', 6" back to junction point 8 and common terminal 3. A feedback resistor 12 is connected from the junction 7 (the junction between the load 5 and the current sensing resistor 6, 6', 6") and junction point 9 connected to inverting input terminal 2. Now, if reference voltage 11 is $E_R$, input resistor 10 is $R_{IN}$, current resistor 6, 6', 6$_{22}$ is $R_S$, feedback resistor 12 is $R_F$ and the load current is $I_0$, then $$I_0 = \frac{E_R R_F + E_R R_S}{R_{IN} R_S}$$

and if $R_S \ll R_F$ $$I_0 = \frac{E_R}{R_{IN}} \times \frac{R_R}{R_S}$$

which in words states that the load current is equal to the input current to the power supply ($E_R/R_{IN}$) multiplied by he ratio of the feedback resistor $R_F$ to the current sensing resistor $R_S$.

Now, the current through the current sensing resistor can be measured by a voltmeter 27–49 connected across it. However, since the load current $I_0$ has been shown to be a function of the value of the current sensing resistor $R_S$, the load current will be modified by the presence of the shunting current meter. In addition, if several ranges are to be metered, the current sensing resistor must be changed as by tap switch 34 and the current meter multiplier resistor 36 must be changed to correspond as by tap switch 35.

In addition, the voltage across the load depends on its resistance since if load 5 is designated as resistance $R_L$, the load voltage $E_0$ will be $E_0 = I_0 R_L$ and will be directly proportional to load resistance $R_L$. Any shunting load as represented by meter 19 in series with its multiplier resistor 20 connected across the load will change the net value of the load resistance and will result in an eror in voltage compliance of the load current. Such an error becomes greater the larger the value of the load resistance. The problem becomes even more serious when additional shunts are placed across the load.

Figure 2:
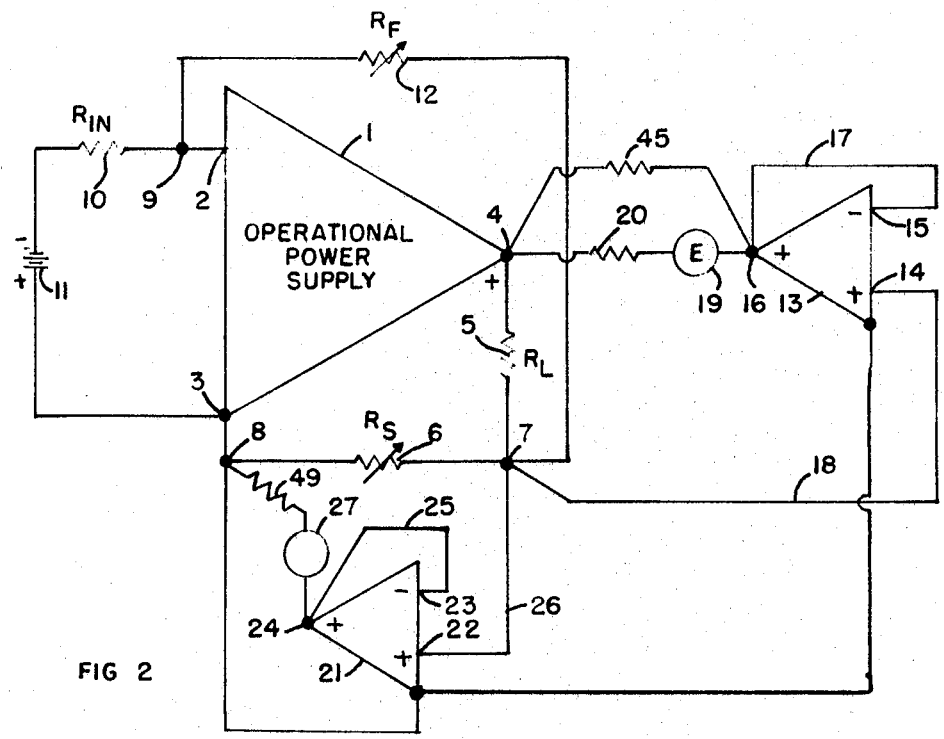
FIG. 2 is a schematic circuit diagram of one form of the present invention.

FIG. 2 is a schematic circuit diagram of one form of the present invention in which two operational amplifiers are added to the circuit, one to drive the current indicating meter and the other to drive the voltmeter and any additional loading which may be present. The components corresponding to those shown in FIG. 1 and described above carry corresponding designations. The current sensing resistor 6 is shown as a variable resistor which may be taken to represent any suitable variable or adjustable current sensing resistor. In order to drive the current indicating meter 27–49 with accuracy and without modifying or changing the computed voltage drop across the current sensing resistor 6, an operational amplifier 21 is provided. Operational amplifier 21 includes an inverting input terminal 23, a non-inverting input terminal 22 and an output terminal 24. Inverting terminal 23 is directly connected to output terminal 24 providing 100 percent feedback so that the input from junction point 7 applied to input terminal 22 is repeated at output terminal 24 to which is connected current indicating meter 27–49. With this mode of operation substantially no error will be caused in the actual voltage drop across the current sensing resistor and this voltage drop will be accurately repeated across current indicating meter 27–49. With the circuit as shown the input impedance at input terminal 22 will be very high and the output impedance driving current indicating meter 27–49 will be very low.

A similar circuit is used to decouple the load voltmeter 19 from the load 5. A second operational amplifier 13 is provided having an inverting input terminal 15, a non-inverting input terminal 14 and an output terminal 16. Inverting input terminal 15 is connected by means of lead 17 to output termial 16. Junction 7 is connected to non-inverting input terminal 14 and voltmeter 19 in series with resistor 20 is connected from output terminal 16 of amplifier 13 to the end of load 5 remote from junction point 7. Since this mode of connection causes the voltage at junction point 7 to be repeated at output terminal 16, meter 19 will indicate the voltage across load 5. Also, since input 14 represents a very high impedance to point 7 and output 16 drives meter 19 from a very low internal impedance, meter 19 will indicate the voltage across load 5 accurately and without apparent loading effect even when resistor 5 has a high value. Furthermore, an additional load such as resistor 45 may be connected between terminals 16 and 4 and will be supplied with the load voltage across load 5 without any additional loading or shunting of load 5.

Figure 3:
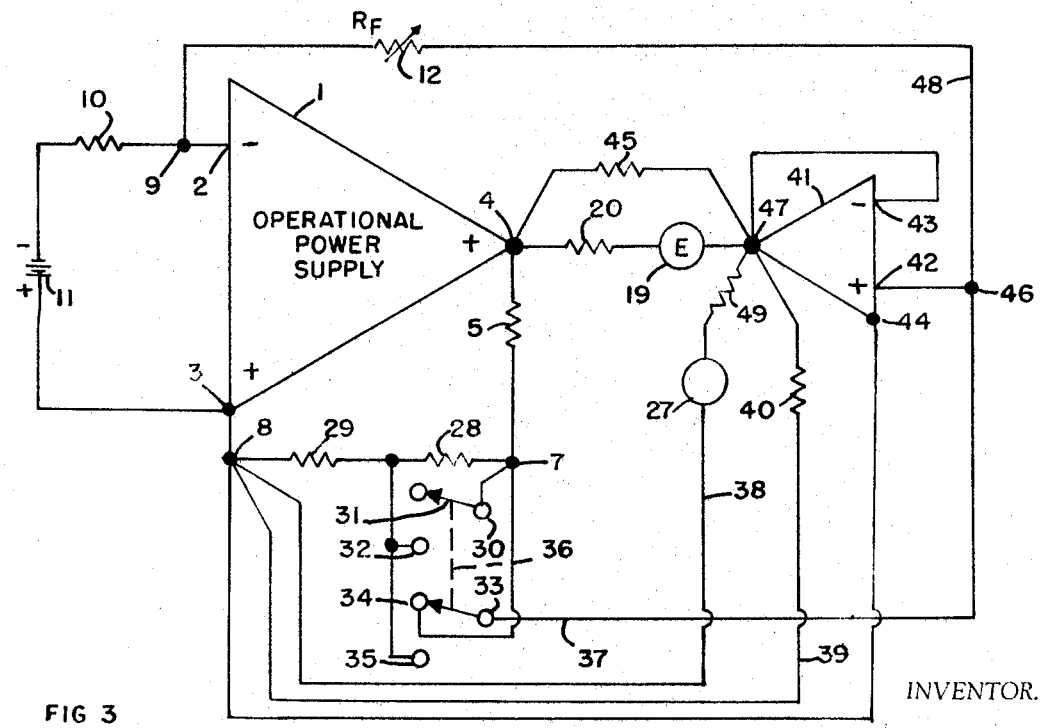
FIG. 3 is a schematic circuit diagram of the preferred form of the present invention.

FIG. 3 is a schematic circuit diagram of a preferred form of the present invention in which a further advantage is derived from the unexpected ability to provide the operation and advantages of FIG. 2 but now by means of only one operational amplifier in place of two. This result is accomplished by means of operational amplifier 41 having an inverting input terminal 43, an output terminal 47 and a non-inverting input terminal 42. Input 43 is connected directly to output 47 thereby providing 100 percent degeneration in the amplifier circuit. Input 42 is connected directly to junction point 7 over lead 33 and lead 48 joined at 46 is connected to feedback resistor 12. Current indicating meter 27–49 is connected from output 47 to common terminal 3 at junction 8 and voltmeter 19–20 is connected from output 47 to the end of load 5 remote from junction 7 at terminals 4. Any additional load 45 is also connected between terminals 47 and 4. Now, since operational amplifier 41 repeats at a low impedance at terminal 47 the potential of terminal 7 while drawing substantially no current, terminal 47 can be treated as if it were terminal 7 and the current and voltmeters can be connected thereto as shown. In FIG. 3 the current sensing resistor is represented by the two resistors 28 and 29 connected in series with two position switch 30–31–32 provided to change the current range by shorting resistor 28 when arm 39 is switched to contact 32. In this way various current ranges can be provided and substantially any load resistance can be accommodated while measuring the load current and the load voltage without errors due to current or voltmeter impedances.

While only a few forms of the present invention have been shown and described, many modifications will be apparent to those skilled in the art and within the spirit and scope of the invention as set forth, in particular in the appended claim.

I claim:

1. Metering circuits in a current regulated power supply including in combination;
    an operational power supply including an inverting input terminal, a common terminal and an output terminal;
    a source of reference voltage, and a reference resistor connected in series between said common terminal and said inverting input terminal;
    a current sensing resistor with one end connected to said common terminal and the other end connected to a first load terminal, said output terminal providing a second load terminal;
    a load resistance connected between said first and second load terminals;
    a feedback resistor connected between said first load terminal and said input terminal for controlling the current supplied to said load resistance;
    an operational amplifier including an inverting input terminal, a non-inverting input terminal, an output terminal and a common terminal;
    a connection between the common terminal of said operational power supply and the common terminal of said operational amplifier;
    a low impedance feedback circuit connected between the inverting input terminal and the output terminal of said operational amplifier for providing unity gain non-inverting with high input impedance operation between the non-inverting input and the output of said operational amplifier;

a connection between the non-inverting input terminal of said operational amplifier and said first load terminal is repeated at the output terminal of said terminal is repeated at the output terminal of said operational amplifier;

a voltmeter connected between the output terminal of said operational amplifier and the output terminal of said operational power supply for indicating the voltage between said first and second load terminals; and a meter connected between the output terminal of said operational amplifier and the common terminal of said operational power supply for indicating the current flowing through said current sensing resistor.

References Cited

Malmstadt et al.; Electronics for Scientists; W. A. Benjamin, Inc., New York; 1963; p. 355.

Birman, P.; Kepco Power Supply Handbook; Kepco, Inc., Flushing, N.Y. 11352; 1965; p. 51.

RUDOLPH V. ROLINEC, Primary Examiner

E. F. KARLSEN, Assistant Examiner

U.S. Cl. X.R.

323—4